(12) United States Patent
Lee et al.

(10) Patent No.: US 8,736,608 B2
(45) Date of Patent: May 27, 2014

(54) SYSTEM AND METHOD FOR RENDERING SURFACE MATERIALS

(75) Inventors: Joo-Haeng Lee, Daejeon (KR); Sung-Soo Kim, Daejeon (KR); Jae Sook Cheong, Daejeon (KR); Jin Sung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1011 days.

(21) Appl. No.: 12/808,180

(22) PCT Filed: Dec. 15, 2008

(86) PCT No.: PCT/KR2008/007421
§ 371 (c)(1),
(2), (4) Date: Jul. 16, 2010

(87) PCT Pub. No.: WO2009/078645
PCT Pub. Date: Jun. 25, 2009

(65) Prior Publication Data
US 2010/0277479 A1    Nov. 4, 2010

(30) Foreign Application Priority Data
Dec. 15, 2007  (KR) .................. 10-2007-0131830

(51) Int. Cl.
*G06T 15/00*  (2011.01)
(52) U.S. Cl.
USPC ........................................................ 345/426
(58) Field of Classification Search
None
See application file for complete search history.

(56) References Cited

U.S. PATENT DOCUMENTS

| | | | |
|---|---|---|---|
| 6,297,834 B1 | 10/2001 | Malzbender | |
| 6,532,014 B1 | 3/2003 | Xu et al. | |
| 7,079,137 B2 | 7/2006 | Borshukov | |
| 7,643,030 B2 | 1/2010 | Papakipos et al. | |
| 2002/0085004 A1 | 7/2002 | Lim et al. | |
| 2006/0132486 A1 | 6/2006 | Kim et al. | |
| 2007/0211069 A1* | 9/2007 | Baker et al. | 345/587 |
| 2008/0158239 A1* | 7/2008 | Lamy et al. | 345/581 |

OTHER PUBLICATIONS

He et al., "A Fast and Accurate Light Reflection Model," Jul. 1992, ACM, pp. 253-254.*
Zhou et al., "Effects of radiative properties of surfaces on radiometric temperature measurement," Sep. 2001, Conference Publications, pp. 183-184.*
Matusik, Wojciech et al., "A Data-Driven Reflectance Model", ACM Transactions on Graphics TOG), MERL BRDF Database, Jul. 2003, pp. 759-769, ISSN: 0730-0301, vol. 22, Issue 3., Mitsubishi Electric Research Laboratories.
Addy Ngan et al., "Experimental Analysis of BRDF Models", The Eurographics Symposium on Rendering, Jun. 2005, The Eurographics Association, Mitsubishi Electric Research Laboratories.

(Continued)

*Primary Examiner* — Daniel Hajnik
*Assistant Examiner* — Andrew G Yang (57) ABSTRACT

A surface material rendering system and method are disclosed. In particular, a surface material rendering system includes a user input part for receiving user inputs; a material information preprocessor for converting surface material information inputted from the user input part in a form of B-spline volumes; a sampling information preprocessor for producing sampling information in proportion to the converted surface material information; and a surface material renderer for rendering surface materials based on the converted surface material information and the sampling information. The system and method can be applied for realistic surface rendering in computer graphics, CAD, and visualization.

12 Claims, 6 Drawing Sheets

(56) References Cited

OTHER PUBLICATIONS

International Search Report for PCT/KR2008/007421 filed on Dec. 15, 2008.

Written Opinion of the International Searching Authority for PCT/KR2008/007421 filed on Dec. 15, 2008.

* cited by examiner

SYSTEM AND METHOD FOR RENDERING SURFACE MATERIALS

TECHNICAL FIELD

The present invention relates to rendering surface materials in three dimensional computer graphics; and, more particularly, to a surface material rendering system and method enabling mixed and multi-resolution rendering of surface materials.

This work was supported by the IT R&D program of MIC/IITA [2006-S-045-02, Development of Function Extensible Real-Time Renderer].

BACKGROUND ART

Recent rapid advances in 3D computer graphics technologies have enabled synthesis of images comparable in quality to photographed images. However, synthesis of high-quality images still requires both excessive calculation times of computers and working hours of designers. Much research and development efforts have been made to solve this problem.

The sense of realism in computer generated imagery (CGI) is affected by various factors, in particular, surface materials of scene elements. Rendering materials having complex physical surface phenomena, such as skins or hairs of a body, fine cloths and mixed paints, requires many considerations. In case of objects composed of these materials, the color and brightness of them may look differently depending upon viewing directions and lighting directions. In some cases, material properties are obtained as raw data by photographing surfaces of real objects, or modeled using algebraic equations, and then reproduced through computer graphics.

DISCLOSURE

Technical Problem

However, raw data is very large in volume and may not fit even in a network render farm having hundreds to thousands of central processing units. Rendering fine surface materials with only mathematical models may lead to enormous computations.

It is, therefore, an object of the present invention to provide a system and method, for rendering surface materials in 3D computer graphics, which can save even though surface material information is given as large-volume raw data or complex mathematical equations in an easily computable form with a reduced volume.

Another object of the present invention is to provide a system and method, for rendering surface materials, which can provide additional sampling information and render the surface materials using mixed and multi-resolution rendering techniques.

Technical Solution

In accordance with one aspect of the present invention, there is provided a surface material rendering system including: a user input part for receiving user inputs; a material information preprocessor for converting surface material information inputted from the user input part in a form of B-spline volumes; a sampling information preprocessor for producing sampling information in proportion to the converted surface material information; and a surface material renderer for rendering surface materials based on the converted surface material information and the sampling information.

It is preferable that the sampling information preprocessor produces samples in proportion to values of a bidirectional reflectance distribution function (BRDF).

It is preferable that the material information preprocessor performs B-spline volumes fitting using raw data including measured texture data, a mathematical texture model and a texture network model, generates multi-resolution texture information and mixed textures, and outputs texture information.

It is preferable that the material information preprocessor includes: a raw material data input part for temporarily storing the raw data inputted by the user; a texture network model input part for receiving the texture network model inputted by the user; a texture network model converting part for converting the texture network model from the texture network model input part, and sending the converted texture network model raw material data to the raw material data input part as raw material data; a mathematical texture model input part for receiving the mathematical texture model inputted by the user; a mathematical material model converting part for converting the mathematical material model from the mathematical texture model input part, and sending the converted mathematical material model to the raw material data input part as the raw material data; a B-spline control information input part for receiving fitting control information necessary for B-spline volume fitting from the user; a B-spline volume fitting part for performing B-spline volumes fitting using the raw material data from the raw material data input part and the fitting control information from the B-spline control information input part, and producing B-spline volume representation information; and a material texture mixing part for mixing multiple pieces of material information together to produce new material data and outputting in the form of a BRDF represented by B-spline volumes.

It is preferable that the material information preprocessor further includes a multi-resolution calculating part for outputting a BRDF by B-spline volumes having different numbers of control points according to a user request.

It is preferable that the texture network model is a shader network model.

It is preferable that the mathematical material model is a Lafortune model.

It is preferable that the sampling information preprocessor generates a cumulative density function table from raw data for derivation of an inverse function, takes samples of important incident angles using a random number generator, and performs B-spline volumes fitting using raw sampling data to store the sampling information.

It is preferable that the sampling information preprocessor includes: a cumulative density function table calculating part for generating the cumulative density function table from raw data to derive the inverse function; a raw sampling data calculating part for taking samples of important incident angles using the random number generator; a B-spline volume fitting part for performing the B-spline volumes fitting using the raw sampling data; and a B-spline integrating part for mathematically integrating B-spline volumes to derive marginal density functions.

It is preferable that the surface material renderer renders texture information in the form of source data or B-spline volumes using the sampling information, supports texture mixing, and outputs a image.

In accordance with another aspect of the present invention, there is provided a surface material rendering method including: converting raw data obtained through texture measurement and mathematical modeling in a form of B-spline volumes having three or four dimensions, and storing the converted raw data; extracting sampling information from texture information through the texture measurement, and storing the extracted sampling information; converting the texture information into multi-resolution texture information, and storing the multi-resolution texture information; mixing multiple pieces of the texture information together; and rendering an object surface using the texture information and the sampling information.

Advantageous Effects

In a feature of the present invention, B-spline volumes are used to render optical phenomena of a complex and fine surface. Hence, the form of measured raw data is preserved, and noise and data size can be significantly reduced. Computation of B-spline volumes is simpler than that of a mathematical model representing surface materials, enabling rapid rendering. In addition, the rendering system and method can be implemented using computer software based on a central processing unit, shader codes based on a graphics processing unit (GPU), or special purpose hardware such as a field-programmable gate array (FPGA).

DESCRIPTION OF DRAWINGS

The above and other objects and features of the present invention will become apparent from the following description of embodiments given in conjunction with the accompanying drawings, in which.

BEST MODE

Hereinafter, embodiments of the present invention will be described in detail with reference to the accompanying drawings so that they can be readily implemented by those skilled in the art.

Figure 1:
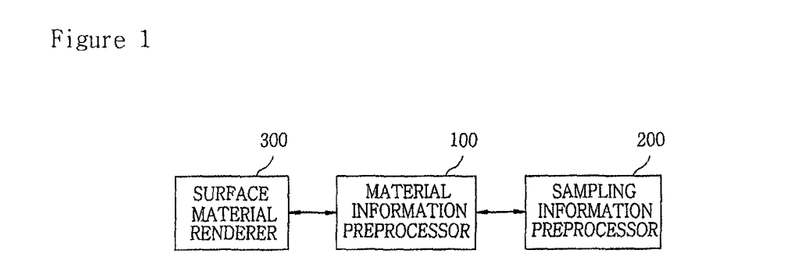
FIG. 1 is a block diagram of a surface material rendering system according to an embodiment of the present invention.

FIG. 1 is a block diagram of a surface material rendering system according to an embodiment of the present invention.

Referring to FIG. 1, the surface material rendering system includes a material information preprocessor 100 for producing surface material information in the form of B-spline volumes which can be used in surface material renderer, a sampling information preprocessor 200 for producing samples proportionate to values of a bidirectional reflectance distribution function (BRDF), and a surface material renderer 300 for rendering surface materials using scene information from the material information preprocessor 100.

In the description, surface material information is given using BRDFs.

The BRDF represents the ratio of the amount of reflected light to the amount of incident light. For given incident light, surface texture is determined by the direction and amount of the reflected light. Hence, the BRDF is a very important factor determining surface texture. Other factors determining surface texture may include the amount, frequencies and direction of incident light.

At a point in the surface, a basic BRDF is defined in terms of two unit vectors: $\omega_i$ pointing toward the light source from the point for the incident light, and $\omega_e$ pointing toward the eye or camera from the point for the reflected light.

A unit vector $\omega$ in a space can be represented by two variables $\Theta$ and in a polar coordinate system ($\omega=(\Theta, \Psi)$), where $\Theta$ (0-90 degrees) denotes the inverse altitude from the zenith and $\Psi$ (0-360 degrees) denotes the azimuth. Hence, the basic BRDF is a four dimensional function whose domain is composed of $\Theta_e$, $\Psi_e$, $\Theta_i$ and $\Psi_i$.

An extended BRDF can be defined in terms of the position and temperature of the surface and frequencies of the light source, in addition to two vectors. Hence, the extended BRDF is a function of at least five dimensions.

In the present invention, surface material information is not limited to a particular dimensionality of the BRDF, and the dimensionality of the BRDF can be increased if necessary. This is because high-dimensional B-spline volumes are used to represent basic surface materials.

B-splines are widely used to represent curves and curved surfaces in computer graphics and CAD. One-dimensional B-splines may represent curves and two-dimensional B-splines may represent curved surfaces. In the present invention, B-splines of at least three dimensions known as B-spline volumes are utilized.

Figure 2:
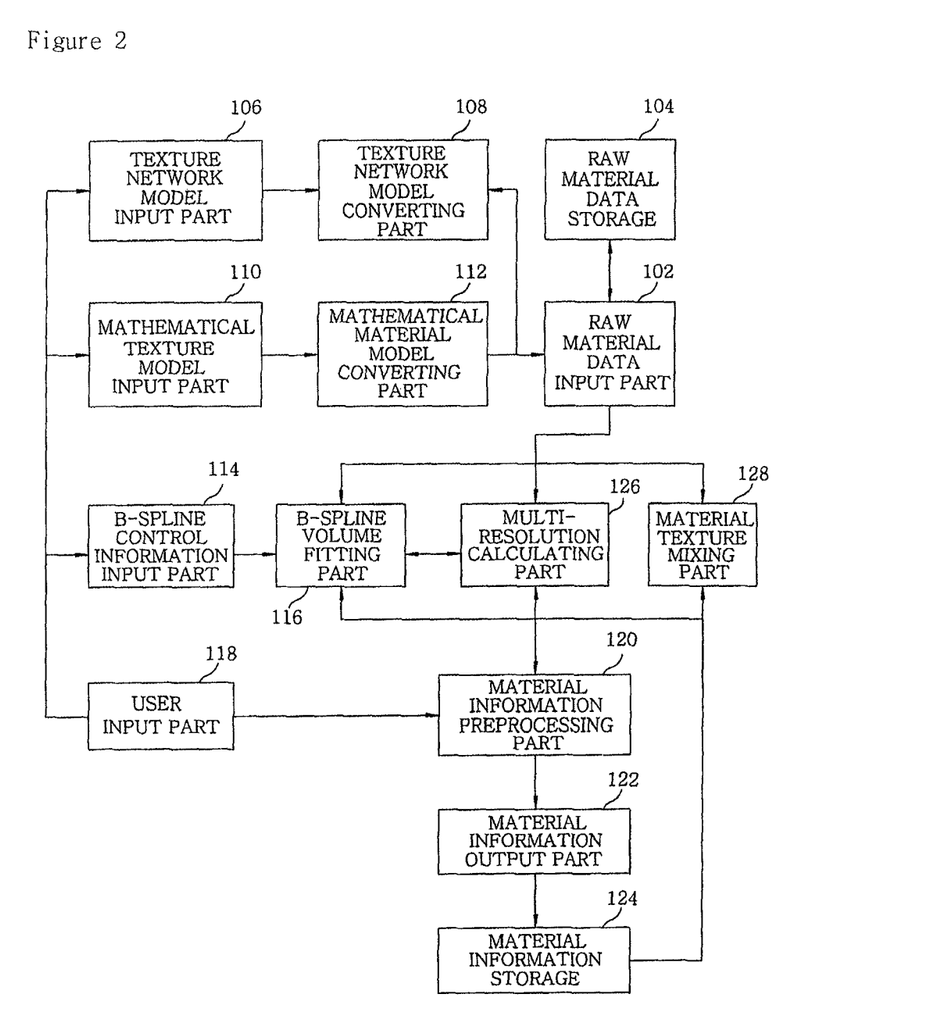
FIG. 2 is a detailed block diagram of a material information preprocessor of FIG. 1.

FIG. 2 is a detailed block diagram of the material information preprocessor 100 in the system of FIG. 1.

Referring to FIG. 2, material information preprocessor 100 includes a raw material data input part 102, raw material data storage 104, texture network model input part 106, texture network model converting part 108, mathematical texture model input part 110, mathematical material model converting part 112, B-spline control information input part 114, B-spline volume fitting part 116, user input part 118, material information preprocessing part 120, material information output part 122, material information storage 124, multi-resolution calculating part 126, and material texture mixing part 128.

Figure 5:
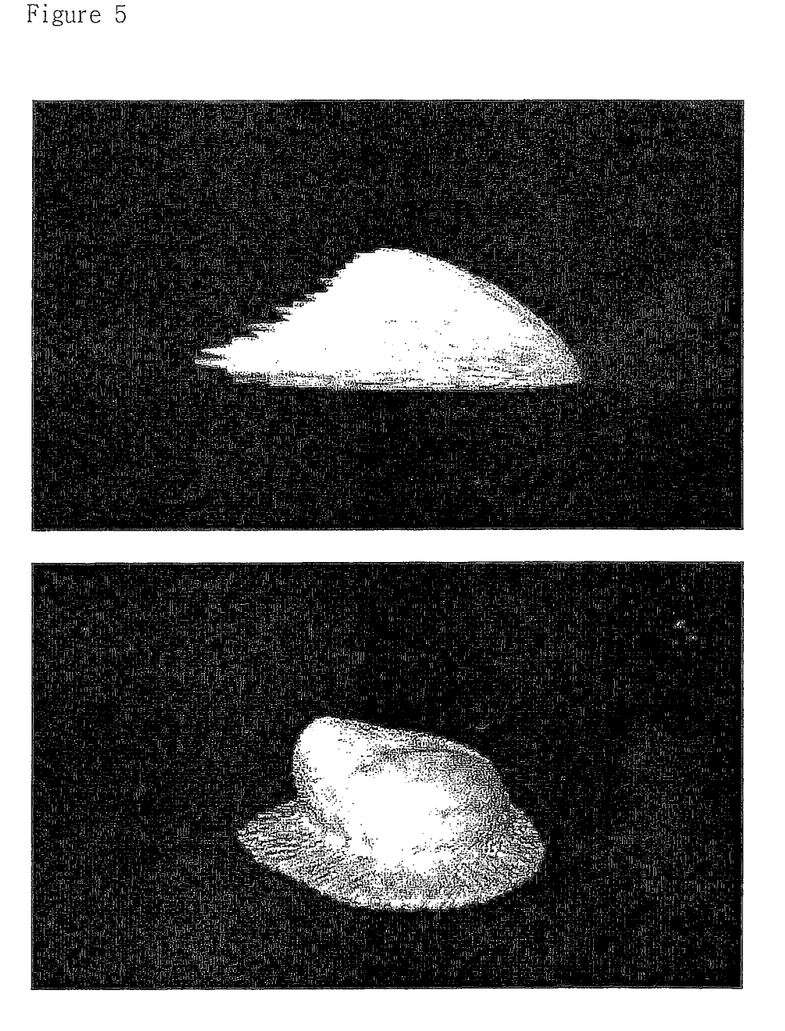
FIG. 5 illustrates a BRDF for measured raw texture data.

The raw material data input part 102 receives raw data and temporarily stores input raw data input or specified by the user, such as measured texture data in a tabular form in the raw material data storage 104. FIG. 5 illustrates a BRDF for the measured raw texture data.

The texture network model input part 106 receives a texture network model such as a "shader network model" through the user input part 118, and sends the same to the texture network model converting part 108.

The texture network model converting part 108 converts a texture network model from the texture network model input part 106 into raw material data, and sends the raw material data to the raw material data input part 102.

The mathematical texture model input part 110 receives a mathematical material model such as a Lafortune model through the user input part 118, and sends the same to the mathematical material model converting part 112.

The mathematical material model converting part 112 converts a mathematical material model from the mathematical texture model input part 110 into raw material data, and sends the raw material data to the raw material data input part 102.

The B-spline control information input part 114 receives through the user input part 118 information necessary for B-spline volume fitting such as the number of control points, error ranges, and dimensions. For example, the user may specify (20, 80, 20 and 80) control points for $\Theta_e$, $\Psi_e$, $\Theta_i$ and $\Psi_i$, respectively, use of 3-dimensional basis function, and error ranges of 0.01.

The B-spline volume fitting part 116 performs B-spline volume fitting using source material data from the source material data input part 102 and fitting control information from the B-spline control information input part 114, produces information representing the fitted B-spline volume such as control points and knot vectors, and stores the information in the material information storage 124.

The raw material data is stored in a tabular form. Indices are ($\Theta_e$, $\Psi_e$, $\Theta_i$ and $\Psi_i$), and values are numbers denoting reflectance. For the RGB color model, three real numbers may be stored. For example, if 90 inverse altitudes and 360 azimuths are used, the table stores 90×360×90×360×3 real numbers.

Figure 6:
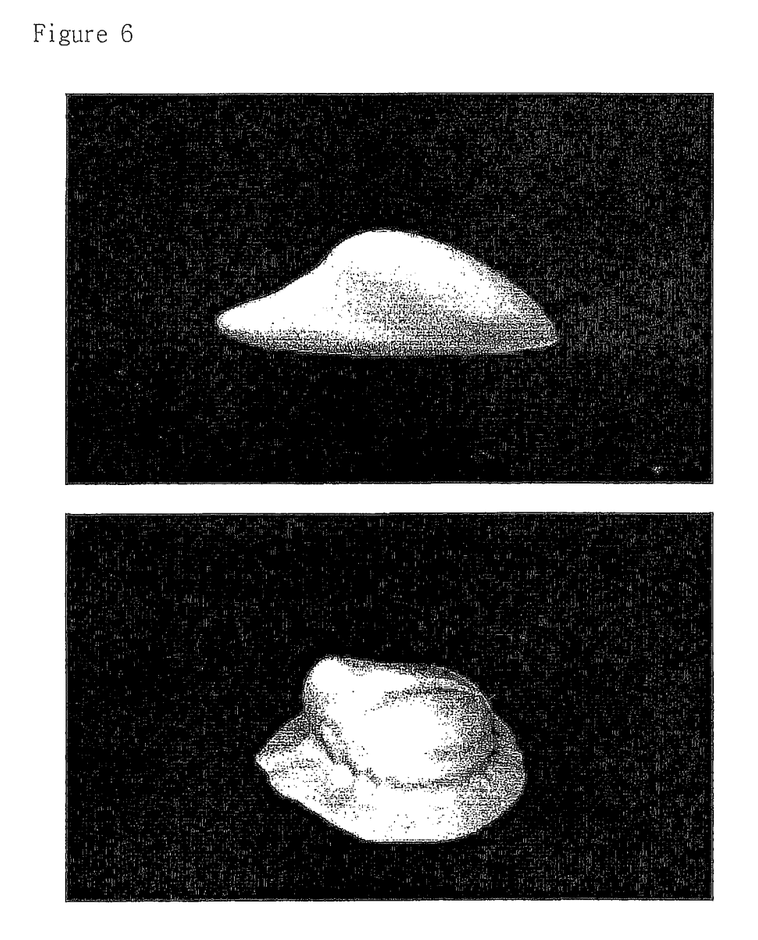
FIG. 6 illustrates a BRDF for B-spline volume fitted texture information.

The material information preprocessing part 120 produces material information in the form of B-spline volumes usable by the surface material renderer 300. Thereto, the material information preprocessing part 120 performs B-spline volume fitting using raw data, mathematical material model, and texture network model input or specified by the user, and outputs the fitted B-spline volume to the material information output part 122. FIG. 6 illustrates a BRDF for B-spline volume fitted material information.

The material information preprocessor 100 can include the multi-resolution calculating part 126 as a supplementary unit. The multi-resolution calculating part 126 outputs a BRDF as B-spline volumes with different numbers of control points according to user's request. This part may enhance computational performance of rendering since use of a simplified BRDF can be effective for rendering the texture of a distant object from the camera. For this effect, the user specifies the maximum and minimum number of control points, and the number of resolution levels. For example, for four levels of resolution, volume fitting may be performed using four sets of control points (20, 80, 20, 80), (15, 60, 15, 60), (10, 40, 10, 40) and (5, 20, 5, 20).

The material texture mixing part 128 mixes multiple pieces of material information together to produce new material data in the form of a BRDF represented by B-spline volumes. This enables creation of a brand-new texture, and the rendering time can be held constant through the use of B-spline volumes even for a complicated texture resulting from the mixture. For example, a well-known mathematical texture model can be mixed with measured source data. Mixture can be controlled to perform on corresponding values in whole or in part. Partial mixture may be configured in the range of specific incident and reflection angles, color components, and frequencies. For example, it is possible to render a surrealistic texture that appears golden when the incident angle is greater than or equal to 45 degrees and appears plastic when the incident angle is less than 45 degrees.

Most modern computations for rendering use Monte Carlo integration. In this case, samples are taken, the function is evaluated at the samples, and obtained values are averaged to approximate the integral. Computational efficiency heavily depends on sample taking. In the case of importance sampling, more samples are taken from areas of the domain which highly impact upon the integral (that is, delivering large function values).

Figure 3:
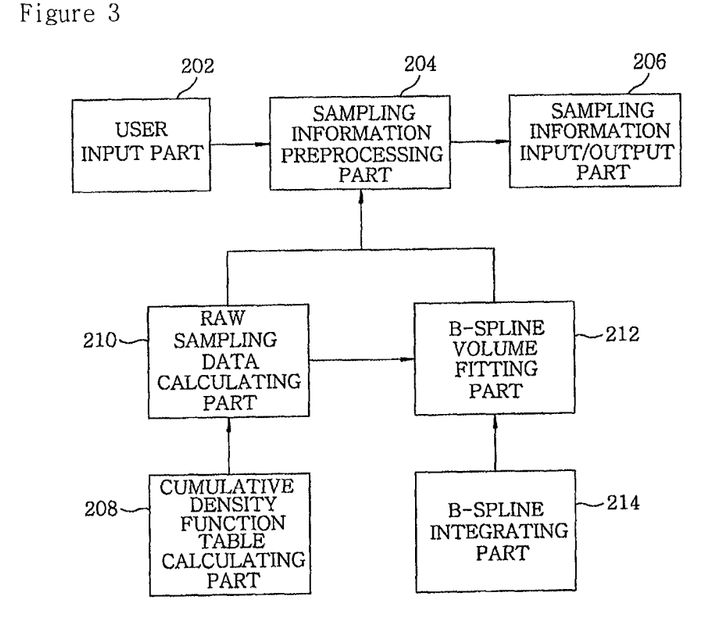
FIG. 3 is a detailed block diagram of a sampling information preprocessor of FIG. 1.

Accordingly, the sampling information preprocessor 200 is adapted to take samples in proportion to BRDF values.

For texture rendering, more samples should be taken from domain areas delivering large BRDF values. BRDF values are computed using a color model. For example, when a RGB color is converted into a XYZ color, the Y-value may be regarded as the magnitude of the BRDF value. If necessary, sampling can be independently performed on individual RGB color components or on frequency bands.

Samples needed for rendering are a series of vectors. That is, when the exitant direction of light toward the camera or eye is determined, more sampling is performed in a direction at which incident light is mainly reflected toward the determined exitant direction, for ray tracing or path tracing.

A vector in a polar coordinate system is represented by an altitude and azimuth. A one-dimensional random number generator provided by a general computer alone cannot generate geometrically uniform vectors with respect to a point (uniform hemisphere sampling). In this case, a converting scheme has been developed for uniform hemisphere sampling. However, for a BRDF taking a complicated form, a converting scheme using marginal density functions should be used.

In the present invention, for BRDF source data, marginal density functions are derived with respect to the inverse altitude and azimuth, and stored in a data structure like a hash table for searching in the form of inverse functions.

Referring to FIG. 3, the sampling information preprocessor 200 includes a user input part 202, sampling information preprocessing part 204, sampling information input/output part 206, cumulative density function table calculating part 208, raw sampling data calculator 210, B-spline volume fitting part 212, and B-spline integrating part 214.

The sampling information preprocessing part 204 processes sampling information from the user input part 202 to output the samples through the sampling information input/output part 206 by producing samples in proportion to BRDF values.

The cumulative density function table calculating part 208 generates a cumulative density function table from raw data to derive an inverse function. In this case, due to properties of the rendering equation, the cosine value of the inverse altitude is applied as a weight.

The raw sampling data calculating part 210 samples important incident angles using a general random number generator. For example, for an input value in the range [0, 1] produced by a one-dimensional random number generator, the value of a corresponding inverse function is computed, and the computed value is used for sampling input vectors.

The B-spline volume fitting part 212 performs B-spline volumes fitting using raw sampling data for data reduction and fast computation. To prevent an increase in the volume of a raw sampling table, the B-spline volume fitting part 212 performs B-spline volumes fitting using raw sampling table, and stores only knot vectors and control points in a data structure like a hash table, enabling rapid search for an inverse function.

The B-spline integrating part 214 supplements the function of the B-spline volume fitting part 212 for more accurate computation, and can directly derive marginal density functions by mathematically integrating B-spline volumes. Mathematical integration can be performed using integration of basis functions.

After preparation of material information and sampling information through the material information preprocessor 100 and the sampling information preprocessor 200, the surface material can be rendered and displayed using input scene information.

Figure 4:
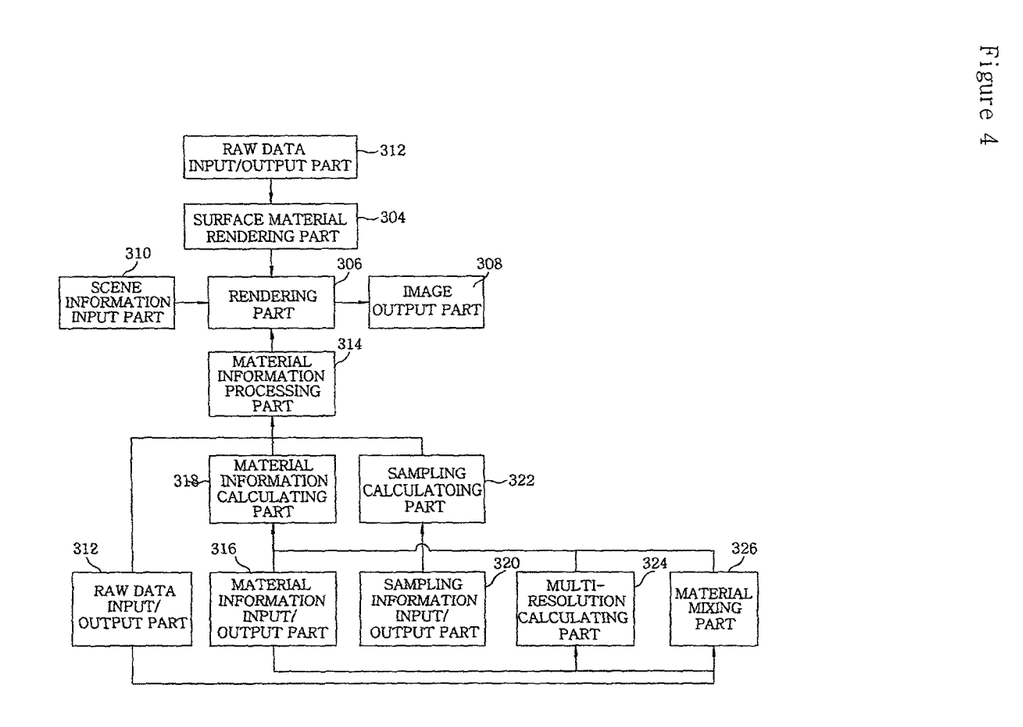
FIG. 4 is a detailed block diagram of a surface material renderer of FIG. 1.

Referring to FIG. 4, the surface material renderer 300 includes a user input part 302, surface material rendering part 304, rendering part 306, image output part 308, scene information input part 310, raw data input/output part 312, material information processing part 314, material information input/output part 316, material information calculating part 318, sampling information input/output part 320, sampling calculating part 322, multi-resolution calculating part 324, and texture mixing part 326.

Scene information input through the scene information input part 310 may include any elements other than material information, such as information regarding surface shapes, illumination, camera, and texture. General shader networks, not represented as a BRDF, may also be input as scene information to the rendering part 306 for processing.

The final result of the surface material renderer 300 is output in the form of an image through the image output part 308.

In particular, for input of BRDF raw data through the raw data input/output part 312, the rendering part 306 delivers a BRDF value corresponding to the inverse altitude and azimuth.

For input of texture information in the form of B-spline volumes a BRDF value may be found using B-spline evaluation through the material information input/output part 316 and the material information calculating part 318. In the material information calculating part 318, a fast B-spline evaluator should be implemented, and may be implemented using computer software, GPU, and special purpose hardware.

Sampling information is input as raw data or B-spline volumes through the sampling information input/output part 320. If no sampling information is input, cosine weighted uniform hemisphere sampling is used.

For input of sampling information in the form of B-spline volumes through the sampling information input/output part 320, the sampling calculating part 322 generates actual sampling information using B-spline evaluation and two pairs of random number generators.

As described before, operations related to multi-resolution and texture mixing can be performed by the material information preprocessor 100. In the surface material renderer 300, during computation for rendering, the multi-resolution calculating part 324 and texture mixing part 326 can also perform operations related to multi-resolution and texture mixing.

While the invention has been shown and described with respect to the embodiments, it will be understood by those skilled in the art that various changes and modifications may be made without departing from the scope of the invention as defined in the following claims.

The invention claimed is:

1. A surface material rendering system comprising:
a user input part for receiving user inputs;
a material information preprocessor for converting surface material information inputted from the user input part in a form of B-spline volumes;
a sampling information preprocessor for producing sampling information in proportion to the converted surface material information; and
a surface material renderer for rendering surface materials based on the converted surface material information and the sampling information, wherein the sampling information preprocessor generates a cumulative density function table from raw data for derivation of an inverse function, takes samples of important incident angles using a random number generator, and performs B-spline volumes fitting using raw sampling data to store the sampling information, wherein the sampling information preprocessor includes:
a cumulative density function table calculating part for generating the cumulative density function table from raw data to derive the inverse function;
a raw sampling data calculating part for taking samples of important incident angles using the random number generator;
a B-spline volume fitting part for performing the B-spline volumes fitting using the raw sampling data; and
a B-spline integrating part for mathematically integrating B-spline volumes to derive marginal density functions.

2. The surface material rendering system of claim 1, wherein the sampling information preprocessor produces samples in proportion to values of a bidirectional reflectance distribution function (BRDF).

3. The surface material rendering system of claim 2, wherein the values of the BRDF are computed using a color model.

4. The surface material rendering system of claim 1, wherein the material information preprocessor performs B-spline volumes fitting using raw data including measured texture data, a mathematical texture model and a texture network model, generates multi-resolution texture information and mixed textures, and outputs texture information.

5. The surface material rendering system of claim 1, wherein the surface material renderer renders texture information in the form of source data or B-spline volumes using the sampling information, supports texture mixing, and outputs a image.

6. The surface material rendering system of claim 1, wherein the sampling information is selected from areas of a domain of a function giving the converted surface material information.

7. A surface material rendering system comprising:
a user input part for receiving user inputs;
a material information preprocessor for converting surface material information inputted from the user input part in a form of B-spline volumes;
a sampling information preprocessor for producing sampling information in proportion to the converted surface material information;
a surface material renderer for rendering surface materials based on the converted surface material information and the sampling information;
a raw material data input part for temporarily storing the raw data inputted by the user;
a texture network model input part for receiving the texture network model inputted by the user;
a texture network model converting part for converting the texture network model from the texture network model input part, and sending the converted texture network model raw material data to the raw material data input part as raw material data;
a mathematical texture model input part for receiving the mathematical texture model inputted by the user;
a mathematical material model converting part for converting the mathematical material model from the mathematical texture model input part, and sending the converted mathematical material model to the raw material data input part as the raw material data;
a B-spline control information input part for receiving fitting control information necessary for B-spline volume fitting from the user;
a B-spline volume fitting part for performing B-spline volumes fitting using the raw material data from the raw material data input part and the fitting control information from the B-spline control information input part, and producing B-spline volume representation information; and a material texture mixing part for mixing multiple pieces of material information together to produce new material data and outputting in the form of a BRDF represented by B-spline volumes, wherein the material information preprocessor performs B-spline volumes fitting using raw data including measured texture data, a mathematical texture model and a texture network model, generates multi-resolution texture information and mixed textures, and outputs texture information.

8. The surface material rendering system of claim 7, wherein the material information preprocessor further includes a multi-resolution calculating part for outputting a BRDF by B-spline volumes having different numbers of control points according to a user request.

9. The surface material rendering system of claim 7, wherein the texture network model is a shader network model.

10. The surface material rendering system of claim 7, wherein the mathematical material model is a Lafortune model.

11. A surface material rendering method comprising:
converting raw data obtained through texture measurement, mathematical modeling, and user inputs in a form of B-spline volumes having three or four dimensions, and storing the converted raw data;

extracting sampling information from texture information through the texture measurement and user inputs, and storing the extracted sampling information, wherein extracting the sampling information includes:
generating a cumulative density function table from the raw data to derive an inverse function;
taking samples of important incident angles using a random number generator to produce raw sampling data;
performing a B-spline volumes fitting using the raw sampling data; and
mathematically integrating the B-spline volumes to derive marginal density functions;

converting the texture information into multi-resolution texture information, and storing the multi-resolution texture information;

mixing multiple pieces of the texture information together; and rendering an object surface using the texture information and the sampling information.

12. The surface material rendering method of claim 11, wherein extracting sampling information includes selecting areas from a domain of a function giving the texture information.

* * * * *